United States Patent
Lin

(10) Patent No.: US 9,870,321 B2
(45) Date of Patent: Jan. 16, 2018

(54) DATA STORAGE DEVICE AND FLASH MEMORY CONTROL METHOD

(71) Applicant: Silicon Motion, Inc., Jhubei (TW)

(72) Inventor: Wen-Sheng Lin, Kaohsiung (TW)

(73) Assignee: Silicon Motion, Inc., Jhubei (TW)

(*) Notice: Subject to any disclaimer, the term of this patent is extended or adjusted under 35 U.S.C. 154(b) by 94 days.

(21) Appl. No.: 14/839,138

(22) Filed: Aug. 28, 2015

(65) Prior Publication Data

US 2016/0124820 A1 May 5, 2016

(30) Foreign Application Priority Data

Nov. 3, 2014 (TW) .............................. 103138009 A

(51) Int. Cl.
| | | |
|---|---|---|
| G06F 11/00 | (2006.01) | |
| G06F 12/1009 | (2016.01) | |
| G06F 3/06 | (2006.01) | |
| G06F 11/14 | (2006.01) | |
| G06F 12/02 | (2006.01) | |

(52) U.S. Cl.
CPC .......... *G06F 12/1009* (2013.01); *G06F 3/065* (2013.01); *G06F 3/0619* (2013.01); *G06F 3/0679* (2013.01); *G06F 11/1435* (2013.01); *G06F 12/0246* (2013.01); *G06F 2212/1032* (2013.01); *G06F 2212/7201* (2013.01); *G06F 2212/7207* (2013.01)

(58) Field of Classification Search
CPC .................................................. G06F 12/0246
See application file for complete search history.

(56) References Cited

U.S. PATENT DOCUMENTS

| | | | | |
|---|---|---|---|---|
| 7,085,879 | B2* | 8/2006 | Aasheim | G06F 12/0246 707/999.103 |
| 7,246,195 | B2 | 7/2007 | Barfuss et al. | |
| 7,516,296 | B2* | 4/2009 | Chang | G06F 12/0246 711/103 |
| 8,266,365 | B2* | 9/2012 | Lasser | G06F 12/0246 711/103 |

(Continued)

FOREIGN PATENT DOCUMENTS

| | | |
|---|---|---|
| TW | 201201214 A | 1/2012 |
| TW | 201348958 A | 12/2013 |

OTHER PUBLICATIONS

Office Action of corresponding TW application, published on Dec. 16, 2015.

*Primary Examiner* — Christopher McCarthy
(74) *Attorney, Agent, or Firm* — Wang Law Firm, Inc.

(57) ABSTRACT

A flash memory control technology with high reliability. In a power recovery process, a microcontroller is configured to duplicate a last write page of a run-time write block of a flash memory and thereby generate a duplicated page in the run-time write block. The microcontroller is further configured use the mapping information accessed from the duplicated page in rebuilding a physical-to-logical address mapping table rather than the mapping information accessed from the last write page. The microcontroller is configured to maintain the physical-to-logical address mapping table on a random access memory for the run-time write block and is further configured to use the physical-to-logical address mapping table to update a logical-to-physical address mapping table maintained in the flash memory.

12 Claims, 4 Drawing Sheets

(56) References Cited

U.S. PATENT DOCUMENTS

| | | | | |
|---|---|---|---|---|
| 8,732,388 B2* | 5/2014 | Chen | ............... | G06F 12/0246 711/103 |
| 9,122,586 B2* | 9/2015 | Ma | ............... | G06F 12/0246 |
| 9,454,474 B2* | 9/2016 | Tomlin | ............... | G06F 12/0246 |
| 9,519,577 B2* | 12/2016 | Kruger | ............... | G06F 12/0246 |
| 2008/0010431 A1* | 1/2008 | Chang | ............... | G06F 12/0246 711/202 |
| 2008/0228995 A1* | 9/2008 | Tan | ............... | G06F 12/0246 711/103 |
| 2008/0320203 A1* | 12/2008 | Fitzgerald | ............... | G06F 1/3225 711/5 |
| 2010/0153660 A1* | 6/2010 | Lasser | ............... | G06F 12/0246 711/154 |
| 2011/0131365 A1* | 6/2011 | Zhang | ............... | G06F 11/1441 711/103 |
| 2013/0067137 A1* | 3/2013 | Molloy | ............... | G06F 12/0246 711/103 |
| 2015/0081960 A1* | 3/2015 | Chen | ............... | G06F 11/1441 711/103 |

* cited by examiner

DATA STORAGE DEVICE AND FLASH MEMORY CONTROL METHOD

CROSS REFERENCE TO RELATED APPLICATIONS

This Application claims priority of Taiwan Patent Application No. 103138009, filed on Nov. 3, 2014, the entirety of which is incorporated by reference herein.

BACKGROUND OF THE INVENTION

Field of the Invention

The present invention relates to data storage devices with flash memory and flash memory control methods.

Description of the Related Art

Flash memory, a data storage medium, is common in today's data storage devices. A NAND flash is one common type of flash memory.

For example, flash memory is typically used in memory cards, USB flash devices, solid-state drives, and so on. In another application with multi-chip package technology, a NAND flash chip and a controller chip are combined in one package as an embedded multi-media card (e.g. eMMC).

The storage space of a flash memory generally provides a plurality of physical blocks, and each physical block includes a plurality of physical pages. To release storage space for reuse, an erase operation has to be performed on a block-by-block basis, to release space one block at a time. When updating data, the new data is written into a spare space rather than being overwritten onto old data, and the old data has to be invalidated. Thus, the storage space management of flash memory is more complex than other storage mediums. A controller designed especially for flash memory is therefore called for. Furthermore, due to the operational features of a flash memory, it is more difficult to manage the mapping information between the logical addresses at the host side and the physical addresses at the flash memory side.

For easy management of storage space of a flash memory, a control unit for a flash memory is generally designed to partially and dynamically maintain the physical-to-logical address mapping information between the host side and the flash memory on a random access memory (e.g. an SRAM) and then upload the mapping information from the random access memory to the flash memory for non-volatile storage. However, the mapping information temporarily stored in the random access memory may disappear due to an unexpected power-off event. How to restore the mapping information in the random access memory during a power recovery process is an important issue in the field.

BRIEF SUMMARY OF THE INVENTION

In the disclosure, for a data storage device using a flash memory as the non-volatile storage medium, a random access memory of the data storage device is restored during a power recovery process to provide accurate physical-to-logical address mapping information between the flash memory and a host.

A data storage device in accordance with an exemplary embodiment of the disclosure comprises a flash memory and a control unit. The flash memory provides a storage space that is divided into a plurality of physical blocks with each physical block comprising a plurality of physical pages. The control unit comprises a microcontroller and a random access memory. The microcontroller is configured to duplicate a last write page of a run-time write block between the plurality of physical blocks during a power recovery process to generate a duplicated page in the run-time write block. The microcontroller is further configured to discard using the mapping information accessed from the last write page to rebuild a physical-to-logical address mapping table during the power recovery process. Instead, the microcontroller is configured to use the mapping information accessed from the duplicated page in rebuilding the physical-to-logical address mapping table. The microcontroller is configured to maintain the physical-to-logical address mapping table on the random access memory for the run-time write block. The microcontroller is configured to use the physical-to-logical address mapping table to update a logical-to-physical address mapping table maintained in the flash memory.

In accordance with another exemplary embodiment of the disclosure, a flash memory control method comprises the following steps: duplicating a last write page of a run-time write block between a plurality of physical blocks of a flash memory during a power recovery process to generate a duplicated page in the run-time write block; and using the mapping information accessed from the duplicated page in rebuilding a physical-to-logical address mapping table in the power recovery process rather than using the mapping information accessed from the last write page. The physical-to-logical address mapping table is maintained on a random access memory for the run-time write block and is used in updating a logical-to-physical address mapping table maintained in the flash memory.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments for carrying out the invention. This description is made for the purpose of illustrating the general principles of the invention and should not be taken in a limiting sense. The scope of the invention is best determined by reference to the appended claims.

Figure 1:
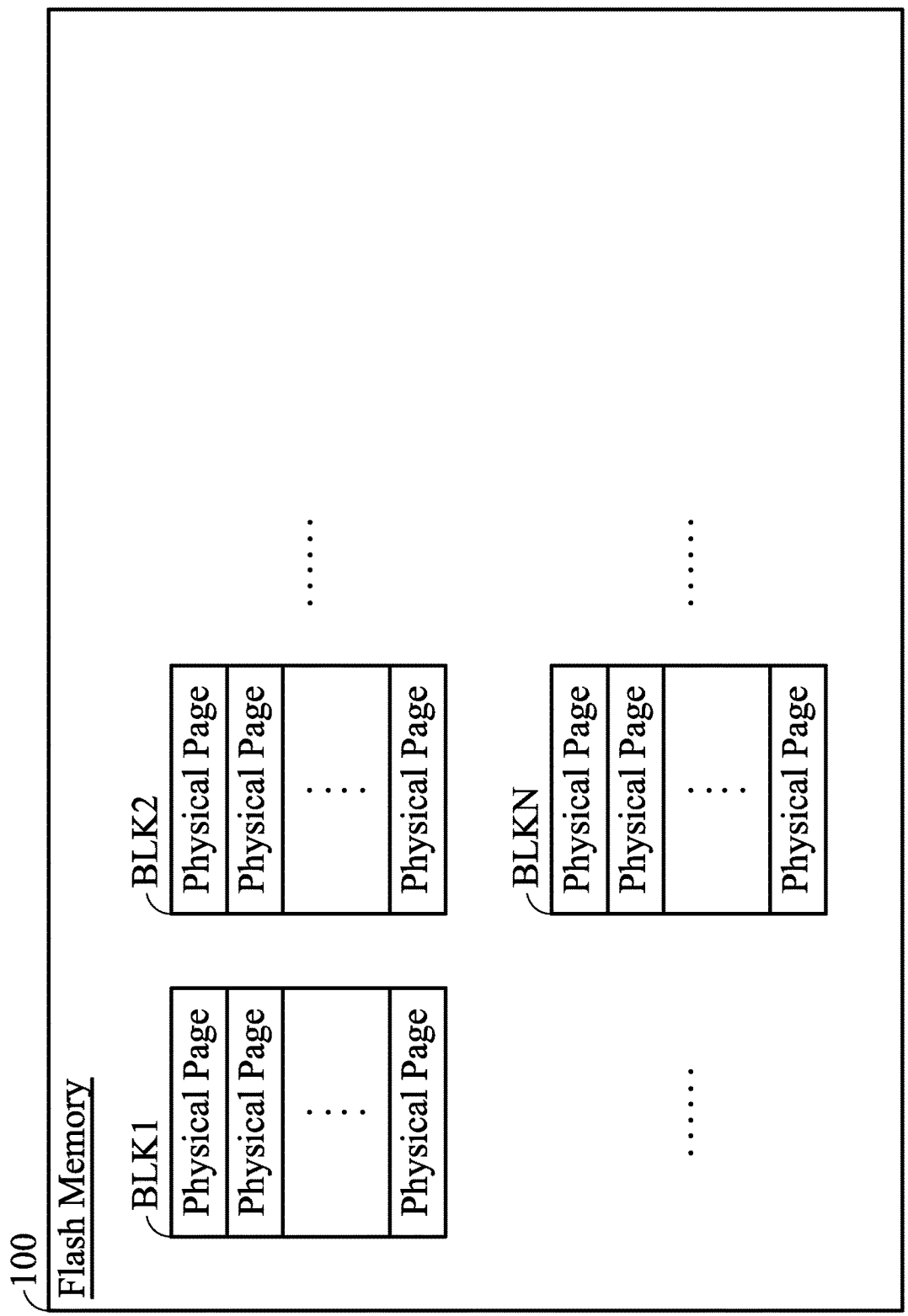
FIG. 1 depicts the storage space provided by a flash memory 100.

FIG. 1 depicts the storage space provided by a flash memory 100, which is divided into a plurality of physical blocks BLK1, BLK2 . . . BLKi . . . Each physical block is further divided into a plurality of physical pages. The physical space in the flash memory 100 is allocated to correspond to logical addresses at the host side and the mapping information between a host side and the flash memory 102 depends on how the host operates the flash memory 100.

Figure 2:
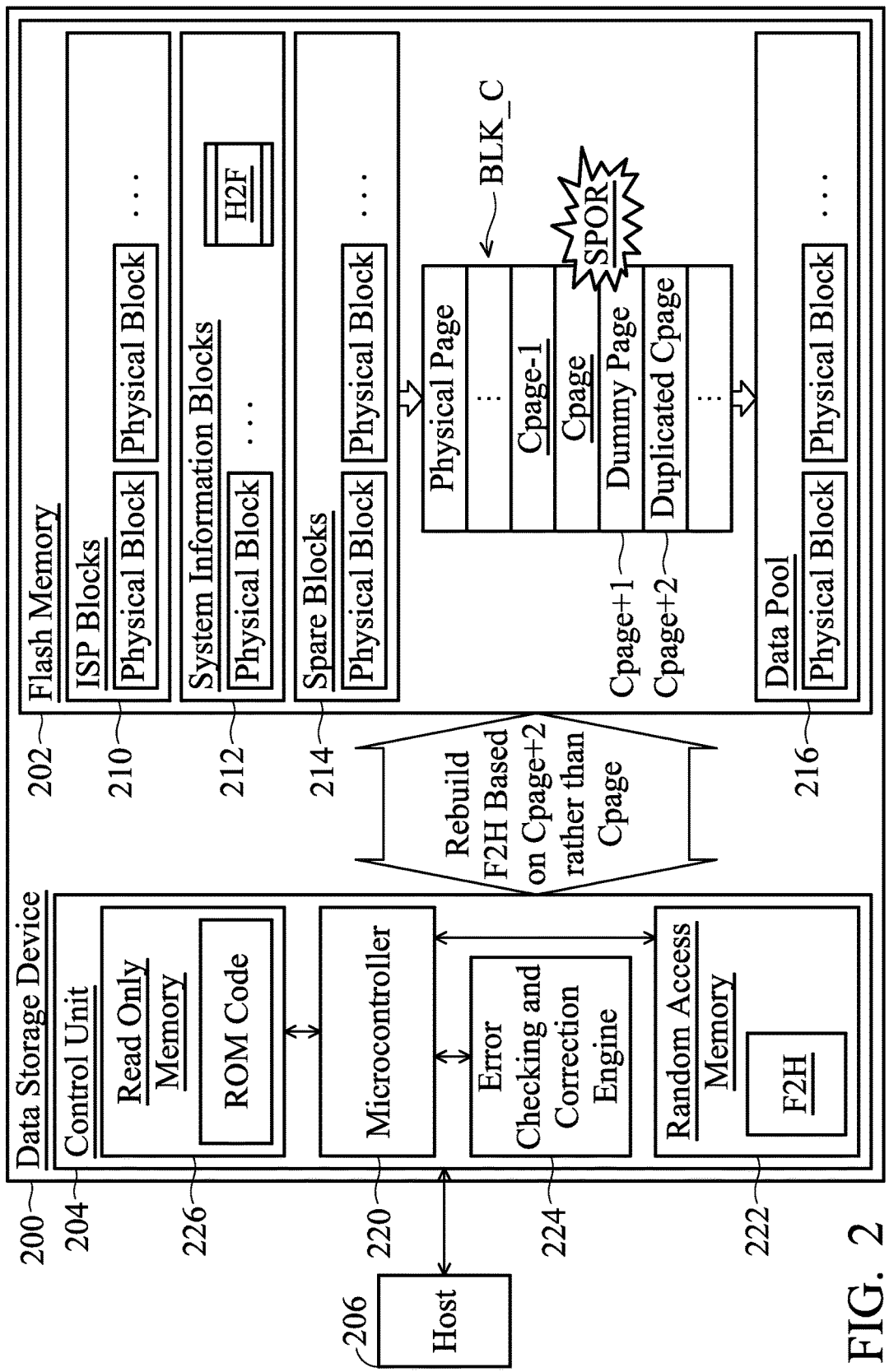
FIG. 2 depicts a data storage device 200 in accordance with an exemplary embodiment of the disclosure.

FIG. 2 depicts a data storage device 200 in accordance with an exemplary embodiment of the disclosure, which comprises a flash memory 202 and a control unit 204. The control unit 204 operates the flash memory 202 in accordance with the commands issued from a host 206.

The storage space of the flash memory 202 is allocated to provide ISP (in-system-program) blocks 210, system information blocks 212, spare blocks 214, a run-time write block BLK_C and a data pool 216. The ISP blocks 210 store in-system programs (ISPs). The is a logical-to-physical address mapping table H2F maintained in the system information blocks 212 to show how the logical addresses at the host 206 side maps to the physical space of the flash memory 202. The run-time write block BLK_C is allocated from the spare blocks 214 for reception of write data issued from the host 206. When the collection of write data on the run-time write block BLK_C is finished, the run-time write block BLK_C is pushed into the data pool 216.

The control unit 204 includes a microcontroller 220, a random access memory 222 (e.g. an SRAM), an error checking and correction engine 224 (e.g. an ECC engine) and a read-only memory 226. The read-only memory 226 stores read-only codes (e.g. ROM code). The microcontroller 220 operates by executing the ROM code stored in the read-only memory 226 or/and by executing the ISPs stored in the ISP blocks 210 of the flash memory 202. The microcontroller 220 is configured to build a physical-to-logical address mapping table F2H on the random access memory 222 for the run-time write block BLK_C. The physical-to-logical address mapping table F2H shows the logical addresses that the physical pages of the run-time write block BLK_C are allocated to. The physical-to-logical address mapping table F2H on the random access memory 222 then is used in updating the logical-to-physical address mapping table H2F maintained in the flash memory 202. The microcontroller 220 is further configured to drive the error checking and correction engine 224.

As shown, the write data collection on the run-time write block BLK_C may be interrupted by an unexpected power-off event SPOR and Cpage is the last write page. During a power recovery process, the microcontroller 220 is configured to duplicate the last write page Cpage of the run-time write block BLK_C and thereby generate a duplicated page Cpage+2 in the run-time write block BLK_C. Instead of using the mapping information accessed from the last write page Cpage to rebuild the physical-to-logical address mapping table F2H, the microcontroller 220 is configured to access the duplicated page Cpage+2 during the power recovery process to get the mapping information contained therein and use the accessed mapping information in rebuilding the physical-to-logical address mapping table F2H. In this manner, the rebuilt physical-to-logical address mapping table F2H shows that the unreliable last write page Cpage that may be damaged by the unexpected power-off event SPOR is regarded as invalid and the duplicated data can be found in the reliable duplicated page Cpage+2. In another exemplary embodiment, the microcontroller 220 is configured to read the run-time write block BLK_C page by page during the power recovery process until a blank page is accessed. The microcontroller 220 is configured to regard the preceding page with respect to the blank page as the last write page Cpage. The last write page Cpage is unreliable and may be completely damaged in an actual situation of an unexpected power-off event, or it may be damaged in that it can only be read one time (incapable of passing the error checking and correction procedure in the later read operations).

In an exemplary embodiment, the microcontroller 220 is further configured to write dummy data into the next page Cpage+1 with respect to the last write page Cpage during the power recovery process. Thus, the unreliable page space Cpage+1 that may also be damaged by the unexpected power-off event SPOR is discarded, too. The duplicated page Cpage+2 is the next page with respect to the dummy page Cpage+1. Before writing dummy data into the next page Cpage+1 with respect to the last write page Cpage, the microcontroller 220 may rebuild the physical-to-logical address mapping table F2H based on the mapping information retrieved from the physical pages prior to the last write page Cpage. The mapping information accessed from the first physical page of the run-time write block BLK_C to the preceding page Cpage−1 with respect to the last write page Cpage is used in rebuilding the physical-to-logical address mapping table F2H.

In another exemplary embodiment, the microcontroller 220 is configured to access the run-time write block BLK_C page by page during the power recovery process and drive the error checking and correction engine 224 to check and correct the accessed pages. The microcontroller 220 may not continue use the spare space of the run-time write block BLK_C when any accessed page does not pass the error checking and correction procedure.

In an exemplary embodiment, the microcontroller 220 is configured to use the mapping information accessed from the preceding page with respect to a specific page in rebuilding the physical-to-logical address mapping table F2H when determining that the specific page passes the error checking and correction procedure. The specific page may be the last write page Cpage or any page prior to the last write page Cpage in the run-time write block BLK_C. For example, the mapping information accessed from the first page of the run-time write block BLK_C is used in rebuilding the physical-to-logical address mapping table F2H when the second page in the run-time write block BLK_C passes the error checking and correction procedure, the mapping information accessed from the second page of the run-time write block BLK_C is used in rebuilding the physical-to-logical address mapping table F2H when the third page in the run-time write block BLK_C passes the error checking and correction procedure and so forth until the last write page Cpage passes the error checking and correction procedure and accordingly the mapping information accessed from physical page Cpage−1 is used in rebuilding the physical-to-logical address mapping table F2H.

Figure 3:
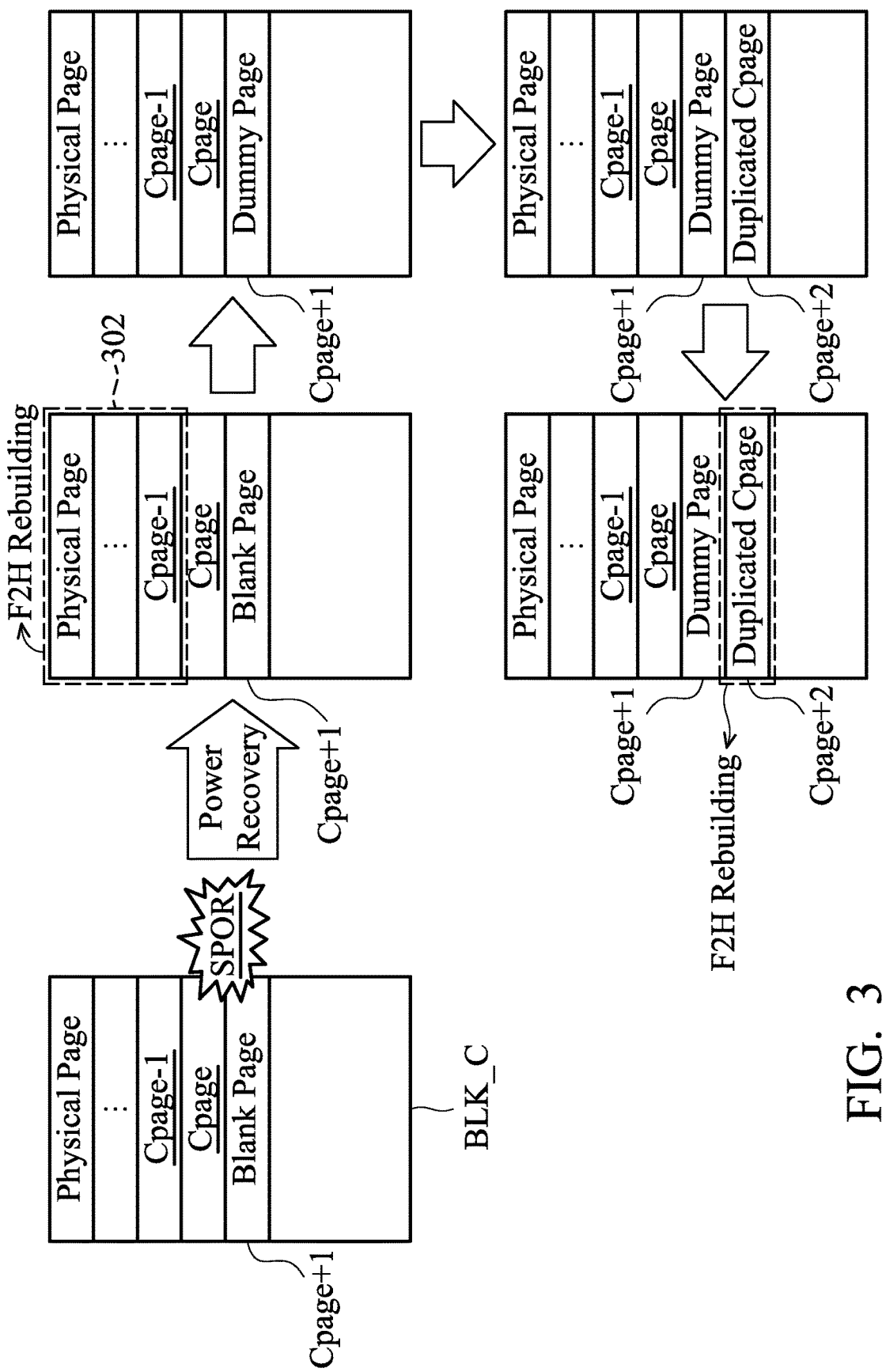
FIG. 3 shows how to rebuild a physical-to-logical address mapping table F2H of a run-time write block BLK_C during a power recovery process in accordance with an exemplary embodiment of the disclosure.

FIG. 3 shows how to rebuild the physical-to-logical address mapping table F2H of the run-time write block BLK_C during a power recovery process in accordance with an exemplary embodiment of the disclosure. As shown, when an unexpected power-off event SPOR occurs, Cpage is the last write page in the run-time write block BLK_C. After power is recovered, the mapping information accessed from the physical pages (marked in the dashed block 302) prior to the last write page Cpage is used in rebuilding the physical-to-logical address mapping table F2H, and then dummy data is written into the next page Cpage+1 with respect to the last write page Cpage, and then the data in the last write page Cpage is duplicated and the duplicated Cpage is written into the next page Cpage+2 with respect to the dummy page Cpage+1. The physical page Cpage+2 with the duplicated Cpage is accessed for rebuilding the physical-to-logical address mapping table F2H.

Figure 4:
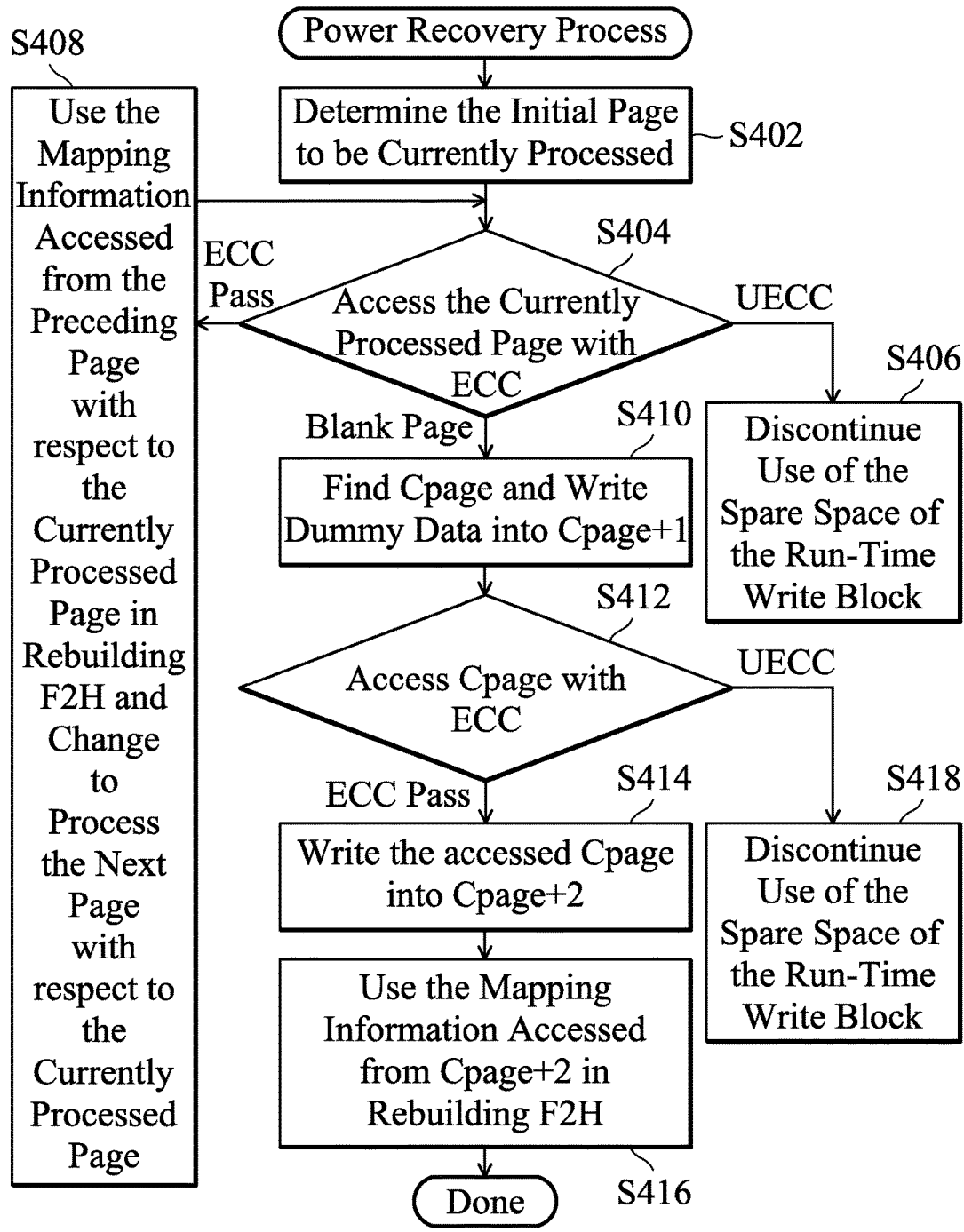
FIG. 4 is a flowchart depicting a power recovery process, in which a physical-to-logical address mapping table F2H of a run-time write block BLK_C is rebuilt.

FIG. 4 is a flowchart depicting a power recovery process, in which the physical-to-logical address mapping table F2H of the run-time write block BLK_C is rebuilt.

In step S402, the first physical page of the run-time write block BLK_C is regarded as the currently processed page. In step S404, the currently processed page is accessed and processed by the error checking and correction engine 224. When the currently processed page cannot pass the error checking and correction procedure, e.g. resulting in ucorrectable ECC errors (UECC), step S406 is performed to discontinue use of the spare space of the run-time write block BLK_C. When the currently processed page passes the error checking and correction procedure, step S408 is performed and the mapping information accessed from the preceding page with respect to the currently processed page is used in rebuilding the physical-to-logical address mapping table F2H and it is changed to regard the next page with respect to the currently processed page as the currently processed page and step S404 is repeated. When the currently processed page is a blank page, step S410 is performed to determine that the preceding page with respect to the blank page is the last write page Cpage and, in step S410, dummy data is written into the next page Cpage+1 with respect to the last write page Cpage. In step S412, the last write page Cpage is accessed and the accessed page Cpage is processed by the error checking and correction engine 224. When the last write page Cpage passes the error checking and correction procedure, step S414 is performed to duplicate the last write page Cpage and write the duplicated page into the next page Cpage+2 with respect to the dummy page Cpage+1. In step S416, mapping information accessed from the duplicated page Cpage+2 is used in rebuilding the physical-to-logical address mapping table F2H. When it is determined in step S412 that the last write page Cpage does not pass the error checking and correction procedure, e.g. resulting in UECC, step S418 is performed, discontinuing use of the spare space of the run-time write block BLK_C.

The invention further involves flash memory control methods, which are not limited to any specific controller architecture. Furthermore, any technique using the aforementioned concept to control a flash memory is within the scope of the invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a flash memory, providing a storage space that is divided into a plurality of physical blocks with each physical block further divided into a plurality of physical pages; and
a control unit, comprising a microcontroller and a random access memory and coupled between a host and the flash memory,
wherein:
the microcontroller is configured to duplicate a last write page of a run-time write block between the plurality of physical blocks during a power recovery process and thereby generate a duplicated page in the run-time write block;
the microcontroller is configured to use mapping information accessed from the duplicated page in rebuilding a physical-to-logical address mapping table rather than mapping information accessed from the last write page;
the microcontroller is configured to maintain the physical-to-logical address mapping table on the random access memory for the run-time write block;
the microcontroller is configured to update a logical-to-physical address mapping table in accordance with the physical-to-logical address mapping table, and the logical-to-physical address mapping table is maintained in the flash memory; and
the microcontroller is configured to write dummy data into a next page with respect to the last write page during the power recovery process to make the next page with respect to the last write page a dummy page.

2. The data storage device as claimed in claim 1, wherein:
the duplicated page is in a next page with respect to the dummy page.

3. The data storage device as claimed in claim 2, wherein:
the microcontroller is configured to use mapping information accessed from physical page(s) prior to the last write page in rebuilding the physical-to-logical address mapping table before forming the dummy page.

4. The data storage device as claimed in claim 3, wherein:
the control unit further comprises an error checking and correction engine;
the microcontroller is configured to access the run-time write block page by page during the power recovery process and drive the error checking and correction engine to process each accessed page; and
the microcontroller is configured to not continue to use the spare space of the run-time write block when the error checking and correction engine fails to correct any page accessed from the run-time write block.

5. The data storage device as claimed in claim 4, wherein:
when determining that a specific page successfully processed by the error checking and correction engine during the power recovery process, the microcontroller is configured to use the mapping information accessed from a preceding page with respect to the specific page in rebuilding the physical-to-logical address mapping table; and
the specific page is the last write page or a physical page prior to the last write page in the run-time write block.

6. The data storage device as claimed in claim 1, wherein:
the microcontroller is configured to access the run-time write block page by page during the power recovery process until a blank page is accessed; and
the microcontroller is configured to regard a preceding page with respect to the blank page as the last write page.

7. A flash memory control method, comprising:
duplicating a last write page of a run-time write block between a plurality of physical blocks of a flash memory during a power recovery process and thereby generate a duplicated page in the run-time write block;
using mapping information accessed from the duplicated page in rebuilding a physical-to-logical address mapping table rather than mapping information accessed from the last write page, wherein the physical-to-logical address mapping table is maintained on the random access memory for the run-time write block and is used in updating a logical-to-physical address mapping table maintained in the flash memory; and writing dummy data into a next page with respect to the last write page during the power recovery process to make the next page with respect to the last write page a dummy page.

8. The flash memory control method as claimed in claim 7, wherein:
the duplicated page is in a next page with respect to the dummy page.

9. The flash memory control method as claimed in claim 8, further comprising:
using mapping information accessed from physical page(s) prior to the last write page in rebuilding the physical-to-logical address mapping table before forming the dummy page.

10. The flash memory control method as claimed in claim 9, further comprising:
providing an error checking and correction engine;
accessing the run-time write block page by page during the power recovery process and driving the error checking and correction engine to process each accessed page; and
not continuing to use the spare space of the run-time write block when the error checking and correction engine fails to correct any page accessed from the run-time write block.

11. The flash memory control method as claimed in claim 10, wherein:
when a specific page is determined successfully processed by the error checking and correction engine during the power recovery process, the mapping information accessed from a preceding page with respect to the specific page is used in rebuilding the physical-to-logical address mapping table; and
the specific page is the last write page or a physical page prior to the last write page in the run-time write block.

12. The flash memory control method as claimed in claim 7, further comprising:
accessing the run-time write block page by page during the power recovery process until a blank page is accessed; and
regarding a preceding page with respect to the blank page as the last write page.

\* \* \* \* \*